United States Patent
Böker (10) Patent No.: US 12,374,969 B2
(45) Date of Patent: Jul. 29, 2025

(54) METHOD FOR PRODUCING LAMINATION STACKS AND FACILITY FOR PERFORMING THE METHOD

(71) Applicant: Kienle + Spiess GmbH, Sachsenheim (DE)

(72) Inventor: Björn Böker, Esslingen (DE)

(73) Assignee: Feintool International Holding AG, Lyss (CH)

( * ) Notice: Subject to any disclaimer, the term of this patent is extended or adjusted under 35 U.S.C. 154(b) by 0 days.

(21) Appl. No.: 17/408,645

(22) Filed: Aug. 23, 2021

(65) Prior Publication Data

US 2021/0391775 A1    Dec. 16, 2021

Related U.S. Application Data

(62) Division of application No. 16/258,602, filed on Jan. 27, 2019, now Pat. No. 11,101,721, which is a
(Continued)

(30) Foreign Application Priority Data

Nov. 17, 2014   (DE) .................... 10 2014 017 149.3

(51) Int. Cl.
*H02K 15/02*      (2025.01)
*F16B 11/00*      (2006.01)

(52) U.S. Cl.
CPC ............ *H02K 15/02* (2013.01); *F16B 11/006* (2013.01); *Y10T 29/49009* (2015.01);
(Continued)

(58) Field of Classification Search
CPC .... H02K 15/02; H02K 15/022; H02K 15/024; H02K 15/10; H02K 15/12;
(Continued)

(56) References Cited

U.S. PATENT DOCUMENTS

| 5,743,965 A * | 4/1998 | Nishimura ............. B05C 11/08 414/217 |
| 2003/0104097 A1* | 6/2003 | Matsumoto ............ G11B 7/265 425/500 |

(Continued)

FOREIGN PATENT DOCUMENTS

| CN | 101495242 | 7/2009 |
| CN | 101730761 | 6/2010 |

(Continued)

OTHER PUBLICATIONS

Translation of JP 2005-269736 provided by Search Fit (Year: 2005).*

*Primary Examiner* — Jeffrey T Carley
*Assistant Examiner* — Joshua D Anderson
(74) *Attorney, Agent, or Firm* — Gudrun E. Huckett (57) ABSTRACT

In a method for producing stacks of laminations, in which at least one adhesive is applied onto annular laminations with at least one application head and laminations are stacked into a stack of laminations, the lamination is rotated about its axis in the application area of the application head and/or the application head is moved about the axis of the lamination in order to apply the adhesive onto the lamination. A system for carrying out the method features at least one punching tool, with which laminations are punched out of a sheet metal material, wherein at least one station for cleaning and/or for activating and/or for applying an adhesive onto the laminations is arranged downstream of the punching tool.

10 Claims, 8 Drawing Sheets

Related U.S. Application Data division of application No. 14/941,866, filed on Nov. 16, 2015, now Pat. No. 10,230,291.

(52) U.S. Cl.
CPC .... *Y10T 29/49055* (2015.01); *Y10T 29/49078* (2015.01); *Y10T 29/53143* (2015.01); *Y10T 29/5317* (2015.01)

(58) Field of Classification Search
CPC ......... Y10T 29/49009; Y10T 29/49012; Y10T 29/49078; Y10T 29/53143; Y10T 29/5317; F16B 11/006; H01F 41/0233; B32B 37/0038; B32B 37/02; B32B 37/1284; B32B 37/1292

See application file for complete search history.

(56) References Cited

U.S. PATENT DOCUMENTS

| | | | |
|---|---|---|---|
| 2006/0066168 A1* | 3/2006 | Shoykhet | H02K 17/16 310/211 |
| 2007/0209175 A1 | 9/2007 | Blocher et al. | |
| 2008/0311298 A1 | 12/2008 | Kappler | |
| 2009/0136660 A1 | 5/2009 | Brune et al. | |
| 2010/0200410 A1 | 8/2010 | Schneider et al. | |
| 2013/0076193 A1* | 3/2013 | Kim | H02K 1/02 310/216.004 |
| 2013/0120485 A1 | 5/2013 | Kodama et al. | |
| 2015/0097463 A1 | 4/2015 | Blocher et al. | |
| 2015/0314563 A1* | 11/2015 | Fluch | B32B 7/12 156/256 |

FOREIGN PATENT DOCUMENTS

| | | | |
|---|---|---|---|
| DE | 19923206 | 11/2000 | |
| DE | 10 2011 010 825 | 8/2012 | |
| JP | 2005269732 A * | 9/2005 | H02K 15/02 |

\* cited by examiner

METHOD FOR PRODUCING LAMINATION STACKS AND FACILITY FOR PERFORMING THE METHOD

CROSS-REFERENCE TO RELATED APPLICATIONS

This application is a divisional application of U.S. application Ser. No. 16/258,602 having a filing dated of 27 Jan. 2019, said application being a divisional application of U.S. application Ser. No. 14/941,866 having a filing date of 16 Nov. 2015, said application claiming a priority date of 17 Nov. 2014. based on prior filed German patent application No. 10 2014 017 149.3, the entire contents of the aforesaid United States applications and the aforesaid German patent application being incorporated herein by reference.

BACKGROUND OF THE INVENTION

The invention pertains to a method for producing stacks of laminations in which at least one adhesive is applied onto annular laminations with at least one application head and laminations are stacked into a stack of laminations or in which the laminations are punched out of a sheet metal strip and at least one adhesive is applied onto the laminations with at least one application head, wherein the laminations provided with the adhesive are stacked into a stack of laminations, as well as to a system for carrying out such a method, the system featuring at least one punching tool, by means of which laminations are punched out of a sheet metal material.

It is known to bundle laminations that are punched out, for example, of an endless strip into stacks, of which rotors and stators for motors and generators are produced. Some laminations within the stack are connected to one another by means of an adhesive that is applied onto the laminations in a punctiform fashion. Since the adhesive is usually applied onto the laminations by means of piezo valves, a corresponding number of piezo valves is required. An application head with such piezo valves therefore has an elaborate design and is correspondingly expensive.

It is furthermore known that insulation varnishes such as, for example, EB5350s have no reproducible chemical and physical properties with respect to their bonding and/or the insulation surface is soiled or contaminated at the nanoscale. This makes it impossible to establish sufficient adhesion between the adhesive and the insulation surface and/or to establish adhesion within the required time.

The invention is based on the objective of realizing the initially cited method and the initially cited system in such a way that a reproducible solid bond between the laminations within a stack can be easily achieved without requiring an elaborate design of the application head.

SUMMARY OF THE INVENTION

According to the invention, this objective is attained in a method of the aforementioned kind in that the lamination is rotated about its axis in the application area of the application head and/or the application head is moved about the axis of the lamination in order to apply the adhesive. The objective is further attained in a method of the aforementioned kind in that:
a) the lamination is punched out in a first position,
b) the lamination is transported into a second position adjacent to the sheet metal strip, in which the adhesive is applied,
c) the lamination is subsequently transported into a third position underneath the sheet metal strip,
d) the next lamination is punched out of the sheet metal strip at the height of the third position and placed under pressure onto the lamination provided with adhesive in the third position,
e) the thusly created partial stack is transported into a fourth position adjacent to the sheet metal strip, in which the adhesive is supplied onto the partial stack,
f) the partial stack is subsequently transported into the first position, in which the next lamination is punched out and placed under pressure onto the partial stack lying thereunder, and
g) steps a) through f) are subsequently repeated until the stack of lamination has the desired height.

The system of the aforementioned kind is characterized in that at least one station for cleaning and/or for activating and/or for applying an adhesive onto the laminations is arranged downstream of the punching tool.

In the first inventive method, the laminations are realized annularly. They may be punched out of a sheet metal strip or a sheet metal plate or produced thereof in a different way, particularly by means of laser cutting. During the application of the adhesive, the annular laminations are positioned in the region of the application head in such a way that the lamination is located in the application area of the application head. The annular lamination is rotated about its axis during the application of the adhesive. In this way, the entire upper side of the lamination passes through the application area of the application head. Consequently, the complete upper side of the annular lamination can be provided with adhesive over its entire surface with a simple constructive design of the application head. Only a small number of application nozzles is required in the application head in order to provide the annular lamination with adhesive over its circumference. Depending on the respective requirements, however, it is also possible to provide only part of the surface of the annular lamination with the adhesive.

The adhesive may also be applied in that the annular lamination remains stationary while the application head or a movable part of the application head moves along the circumference of the annular lamination such that the adhesive can be applied over the entire circumferential area or over only part of the circumferential area of the lamination. It is ultimately also possible to respectively rotate and move the lamination and the application head about the axis of the lamination during the application of the adhesive.

It is advantageous if the lamination and/or the application head are respectively rotated or moved in a uniform fashion. In this way, the adhesive can be easily applied onto the desired lamination areas over the circumference of the annular lamination. In addition, it is correspondingly simple to control the motion of the lamination and/or the application head.

The laminations are rotated about their axis by a defined angle of rotation such that the annular surface of the laminations can be provided with the adhesive over its entire circumference.

The application head or the movable part of the application head is advantageously also moved about the axis of the annular lamination by a defined angle of rotation such that the adhesive can be applied onto the upper side of the lamination over the entire circumference thereof.

The annular upper side and underside of the lamination are advantageously cleaned and/or activated before the adhesive is applied. To this end, conventional jet blasting methods such as compressed air jets, $CO_2$ snow jets and/or plasma jets or aqueous cleaning methods can be used in order to reliably remove inorganic and/or organic dirt particles located on the surface of the laminations.

The familiar atmospheric-pressure plasma method is preferably used for activating the surface of the annular laminations. For this purpose, the insulation layer of the electric metal sheet is respectively treated and modified due to chemical/physical reactions at the nanoscale and thereby ensures an exactly defined and highly efficient surface.

The cleaning and/or activating operation ensures that the adhesive reliably adheres to the surface of the annular lamination.

The adhesive may already be applied before the lamination is punched out. In this case, the punching tool is designed in such a way that it does not come in contact with the adhesive.

However, it is also possible to apply the adhesive after the annular lamination has been punched out. A special punching tool is not required in this case.

The second inventive method is suitable for laminations that are not realized annularly. For example, the laminations may be realized in the form of ring segments that are stacked into part-ring stacks. These part-ring stacks are subsequently assembled into the annular stacks. In this method, the laminations are punched out in a first position. They are subsequently transported into a second position that is located in the region adjacent to the sheet metal strip. In this second position, the adhesive is applied onto the upper side of the lamination. This lamination is subsequently transported into a third position that is located underneath the sheet metal strip. The next lamination is then punched out of the sheet metal strip at the height of this third position and subsequently placed under pressure onto the lamination provided with the adhesive in this position. In this way, a partial stack is produced, in which the laminations lying on top of one another are connected by means of the adhesive. The partial stack is transported into a fourth position that is located in the region adjacent to the sheet metal strip and the adhesive is applied onto the partial stack in this position. Subsequently, this partial stack is transported back to the first position that is once again located in the region underneath the sheet metal strip. In this first position, the next lamination is punched out and placed under pressure onto the partial stack that lies thereunder and features the adhesive applied onto its upper side in the fourth position. In this way, the laminations are successively punched out and stacked into a stack until this stack has the desired height.

The adhesive is advantageously applied onto the laminations in a contactless fashion.

It is naturally also possible to apply the adhesive onto the laminations with a contacting method.

The adhesive may be applied in a planar, linear or punctiform fashion. To this end, it is merely required to open the corresponding application nozzle for a correspondingly long or brief time period and to control and monitor the application nozzles in a product-specific relation to the feed rate by means of a control unit such as, for example, an SPS-control.

The inventive method particularly makes it possible to apply the adhesive in such a quantity that the adhesive surface area on the upper side of the lamination amounts to at least approximately 50% of the overall surface area of the upper side of the lamination. This large proportion of adhesive results in the laminations being reliably connected to one another within the stack. This large adhesive surface area also does not require an elaborate construction of the application head.

The adhesive surface area is advantageously larger than approximately 60% of the overall surface area of the upper side of the lamination.

In the second method, the laminations may be realized, for example, in a T-shaped fashion.

In this method, the laminations are advantageously transported between the different positions by means of a rotatable die.

It is advantageous if the laminations are respectively transported between the individual positions by 90°.

The inventive method makes it possible to reliably process particularly thin workpieces that usually have a thickness of less than 1 mm. Particularly laminations with different quality, thickness, properties and coating can be processed. It is even possible to use laminations with different quality, thickness, properties and coating within the stack.

In the inventive system, at least one station, in which the laminations are cleaned and/or activated and/or provided with adhesive, is arranged downstream of the punching tool, in which the laminations are punched out. In this context, it would be possible that the system features a separate station for each operation. However, all three operations, namely cleaning, activating and applying the adhesive, can also be carried out in a single station. Since this station is not arranged in the punching tool, but rather outside thereof, the punching tool remains free of potential contaminations that could occur while the laminations are cleaned and/or activated and/or provided with the adhesive.

In an advantageous embodiment, the system is realized in such a way that the laminations are not stacked into stacks within the punching tool, but rather outside thereof.

In an advantageous embodiment, the station for applying the adhesive and/or for cleaning and/or for activating the laminations is provided with at least one application device that is arranged in the region of a rotary unit. The laminations lie on this rotary unit and are rotated about their axis thereby. In this case, the laminations are preferably realized annularly. They are rotated about their axis underneath the application device by means of the rotary unit. In this way, the entire circumference of the laminations passes through the working range of the application device, which can thereby carry out the corresponding operations.

In another advantageous embodiment, the laminations stand still while they are cleaned and/or activated and/or provided with the adhesive. In this case, the application device is designed in such a way that it is moved along the laminations.

The laminations can also be cleaned and/or activated and/or provided with adhesive over their entire length in this case.

The invention is not only defined by the subject matter of the individual claims, but also by all information and features disclosed in the drawings and the description. Even if they are not subject matter of the claims, they are claimed as being essential to the invention insofar as they are novel in comparison with the prior art individually or in combination.

Other features of the invention result from the other claims, the description and the drawings.

BRIEF DESCRIPTION OF THE DRAWINGS

The invention is described in greater detail below with reference to a few exemplary embodiments that are illustrated in the drawings. In these drawings.

DESCRIPTION OF PREFERRED EMBODIMENTS

In the following description, it is explained with reference to different exemplary embodiments how laminations lying on top of one another within a stack can be solidly connected to one another by means of at least one adhesive. The systems and devices used in this case are realized in such a way that the individual laminations have a relatively large adhesive surface area that amounts, for example, to more than approximately 60% of the overall surface area of the lamination. In this case, the adhesive may be applied onto the respective lamination in a punctiform, linear or even planar fashion. The devices used for this large-surface adhesive application are characterized by a very simple and space-saving constructive design.

Figure 1:
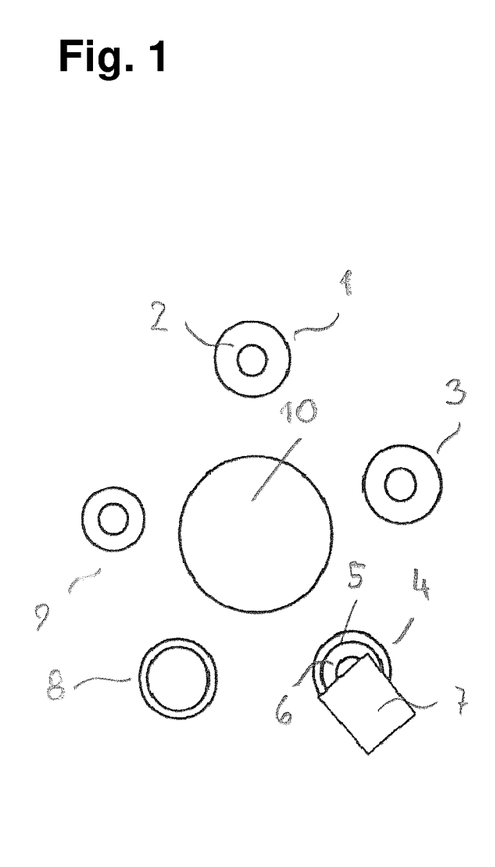
FIG. 1 shows a schematic illustration of an inventive notching press in the form of a circular arrangement.

FIG. 1 shows a schematic illustration of an exemplary notching press in the form of a circular arrangement. This system has a first station 1, in which laminations 2 in the form of round sheet metal blanks are stored. A transport system 10 transports the laminations 2 to a second station 3, in which the laminations 2 are aligned for further processing. The transport system then transports the aligned laminations 2 into a third station 4. In this station, an annular stator lamination 5 and an annular rotor lamination 6 are conventionally punched out of the round sheet metal blank 2. Subsequently, the laminations 5, 6 are cleaned and the adhesive is applied thereon with a device 7.

The transport system feeds the outer stator lamination 5 to a fourth station 8, in which the stator laminations 5 are stacked into a stator stack. The stator laminations 5 lying on top of one another are held together by means of the adhesive. Before they are stacked, the individual annular stator laminations 5 are aligned in such a way that the stator stack being produced has the same axial height over its circumference.

The transport system 10 feeds the annular rotor laminations 6 to a fifth station 9, in which the annular rotor laminations 6 are stacked into a rotor stack. Before they are placed on top of one another, the rotor laminations 6 are aligned in such a way that the rotor stack has the same axial thickness over its circumference. The rotor laminations lying on top of one another are reliably held together by means of the adhesive applied in the station 4.

In this exemplary embodiment, the stations 1, 3, 4, 8, 9 are arranged on a circle around the transport system 10.

Figure 2:
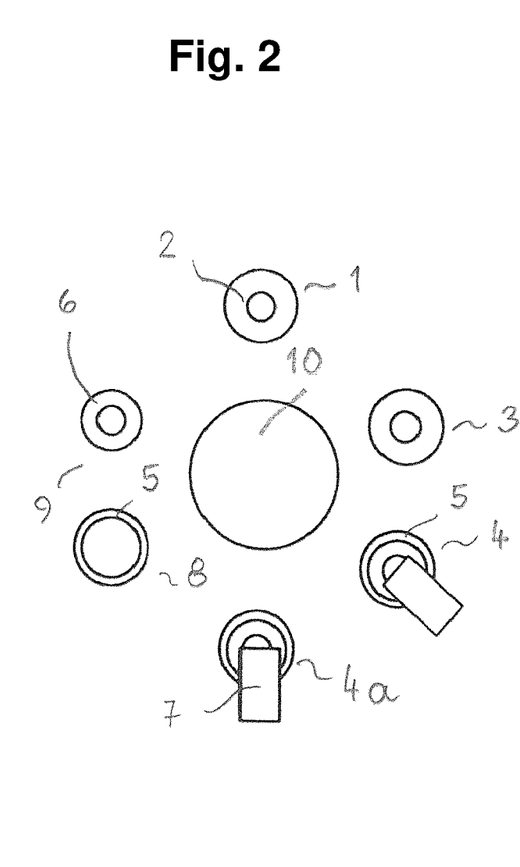
FIG. 2 shows a schematic illustration of a third embodiment of an inventive notching press in the form of a circular arrangement.

The notching press according to FIG. 2 is likewise realized in the form of a circular arrangement, i.e. the individual stations lie on a circle around the centrally arranged transport system. The notching press is essentially realized identically to the preceding exemplary embodiment. The round sheet metal blanks 2 are stored in the station 1. From this station, they are fed to the second station 3, in which the round sheet metal blanks 2 are aligned, by means of the transport system 10. The annular stator laminations 5 and the annular rotor laminations 6 are punched out of the round sheet metal blanks 2 in the third station 4.

The transport system 10 feeds the laminations 5, 6 to a fourth station 4a, in which they are cleaned and the adhesive is applied thereon.

In the following fifth station 8, the stator laminations 5 are aligned in the described fashion and assembled into a stator stack. In the following sixth station 9, the annular rotor laminations 6 are aligned in the described fashion and assembled into a rotor stack.

Figure 3:
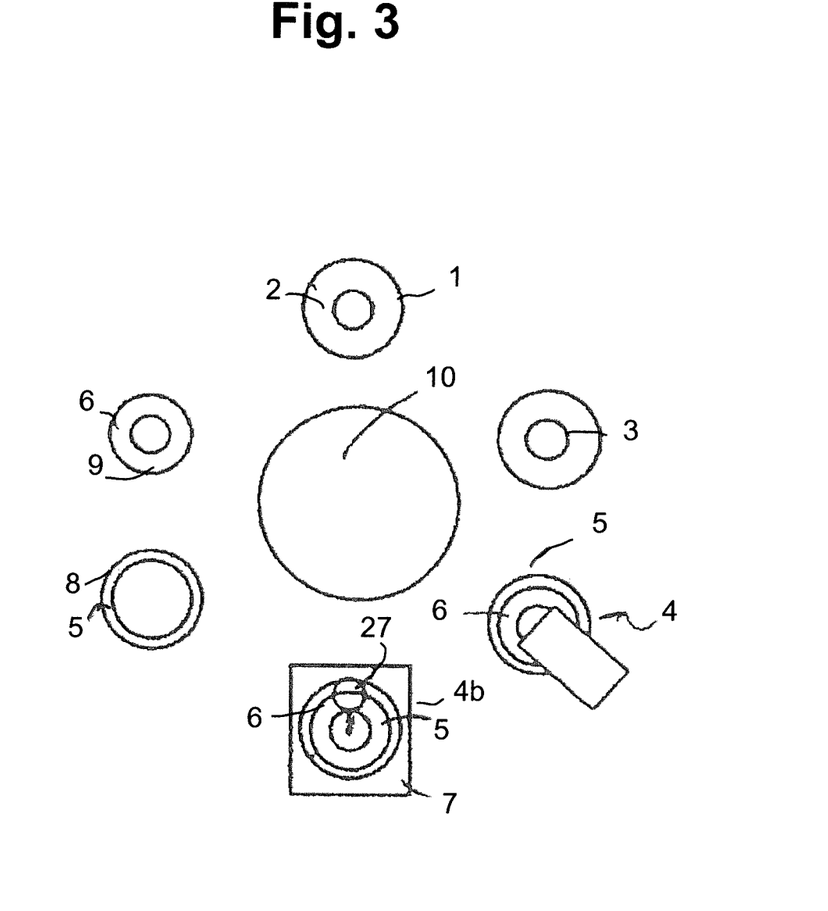
FIG. 3 shows a schematic illustration of a third embodiment of an inventive notching press system in the form of a circular arrangement.

The notching press according to FIG. 3 is likewise realized in the form of a circular arrangement, i.e. the individual stations lie on a circle around the centrally arranged transport system 10. The notching press is essentially realized identically to the preceding exemplary embodiment. The round sheet metal blanks 2 are stored in the station 1. From this station, they are fed to the second station 3, in which the round sheet metal blanks 2 are aligned, by means of the transport system 10. The annular stator laminations 5 and the annular rotor laminations 6 are punched out of the round sheet metal blanks 2 in the third station 4.

The transport system 10 feeds the laminations 5, 6 to a fourth station 4b, in which they are cleaned and the adhesive is applied thereon. In this example, the cleaning and/or activating nozzles, as well as the adhesive application valves, are moved around the laminations 5, 6 by means of a movable device unit 27 that is located in a stationary device unit 7.

In the following fifth station 8, the stator laminations 5 are aligned in the described fashion and assembled into a stator stack. In the following sixth station 9, the annular rotor laminations 6 are aligned in the described fashion and assembled into a rotor stack.

In contrast to the first exemplary embodiment, the punching of the two laminations 5, 6, as well as the cleaning and the application of the adhesive, are respectively carried out in the two stations 4, 4a (FIG. 2) or 4, 4b (FIG. 3). In the embodiment according to FIG. 1, the punching operation, the cleaning and the application of the adhesive were carried out in only one station 4.

Figure 4:
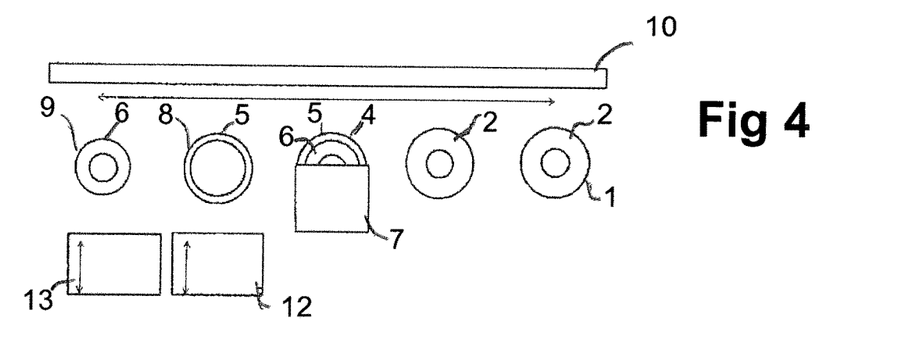
FIG. 4 shows a schematic illustration of another embodiment of an inventive notching press in the form of a linear arrangement.

In the embodiment according to FIG. 4, the individual stations of the notching press are configured in a linear arrangement, i.e. they are arranged adjacent to one another along a linear transport system 10. The annular sheet metal blanks 2 are also used as starting material for the stator laminations 5 and the rotor laminations 6 in this embodiment. They are either cut out of metal sheets by means of lasers or conventionally punched out of endless metal sheets. This also applies to the round sheet metal blanks 2 used in the notching presses according to FIGS. 1, 2 and 3. Since the removal of the round sheet metal blanks from metal sheets by means of lasers or punching out of endless metal sheets is a common practice, it is not described in greater detail in this context.

The round sheet metal blank 2 are once again stored in the first station 1. The transport system 10 feeds the round sheet metal blanks 2 to the second station 3, in which the round sheet metal blank 2 are aligned. Subsequently, the transport system 10 transports the aligned round sheet metal blanks 2 to the third station 4, in which the annular stator laminations 5 and the annular rotor laminations 6 are punched out of the round sheet metal blanks 2 similar to the embodiment according to FIG. 1. Both laminations 5, 6 are subsequently cleaned with the device 7 and the adhesive is applied.

In the following station 8, the annular stator laminations 5 are stacked into a stator stack. For this purpose, a joining unit 12 is provided, by means of which the annular stator laminations 5 are aligned and stacked into a stator stack. The adhesive ensures that the stator laminations 5 within the stator stack are solidly connected to one another. The stator stack has the same axial height over its circumference because the stator laminations were aligned before they were stacked.

The transport system 10 feeds the annular rotor laminations 6 to the station 9, in which the rotor laminations 6 are stacked into a rotor stack by means of a joining unit 13. Before the rotor laminations 6 are placed on top of one another, they are aligned in such a way that the rotor stack being produced has the same axial height over its circumference. The rotor laminations 6 lying on top of one another within the rotor stack are solidly connected to one another by means of the adhesive.

Figure 5:
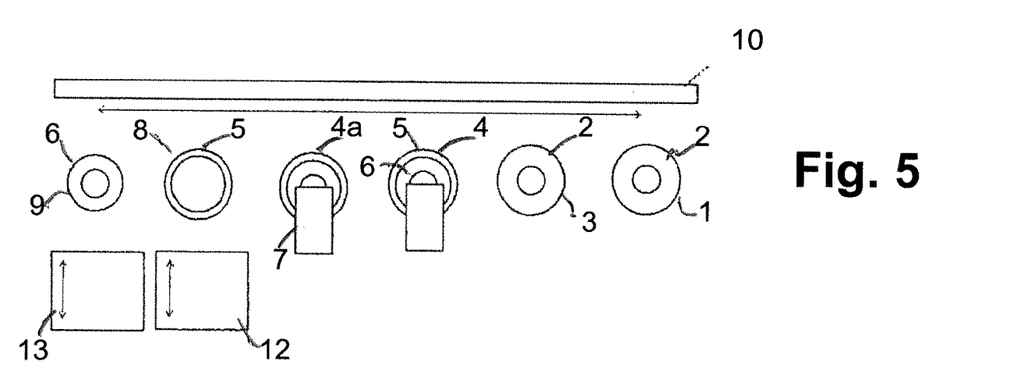
FIG. 5 shows a schematic illustration of another embodiment of an inventive notching press in the form of a linear arrangement.

The notching press according to FIG. 5 is likewise configured linearly and features a linear transport system 10, along which the individual stations lie adjacent to one another in a linear arrangement. The round sheet metal blanks 2 are once again stored in the first station 1. The transport system 10 feeds the round sheet metal blanks 2 to the second station 3, in which the round sheet metal blanks 2 are aligned. Subsequently, the transport system 10 transports the aligned round sheet metal blanks 2 to the third station 4, in which the annular stator laminations 5 and the annular rotor laminations 6 are punched out of the round sheet metal blanks 2 similar to the embodiment according to FIG. 2. Subsequently, the transport system 10 feeds the punched-out laminations 5, 6 to the station 4a, in which the laminations 5, 6 are cleaned, as well as activated. The application of the adhesive subsequently takes place.

In the following station 8, the annular stator laminations 5 are stacked into a stator stack. For this purpose, the joining unit 12 is provided, by means of which the annular stator laminations 5 are aligned and stacked into a stator stack. The adhesive ensures that the stator laminations 5 within the stator stack are solidly connected to one another. The stator stack has the same axial height over its circumference because the stator laminations 5 were aligned before they were stacked.

The transport system 10 feeds the annular rotor laminations 6 to the station 9, in which the rotor laminations 6 are stacked into a rotor stack by means of the joining unit 13. Before the rotor laminations 6 are placed on top of one another, they are aligned in such a way that the rotor stack being produced has the same axial height over its circumference. The rotor laminations 6 lying on top of one another within the rotor stack are solidly connected to one another by means of the adhesive.

Figure 6:
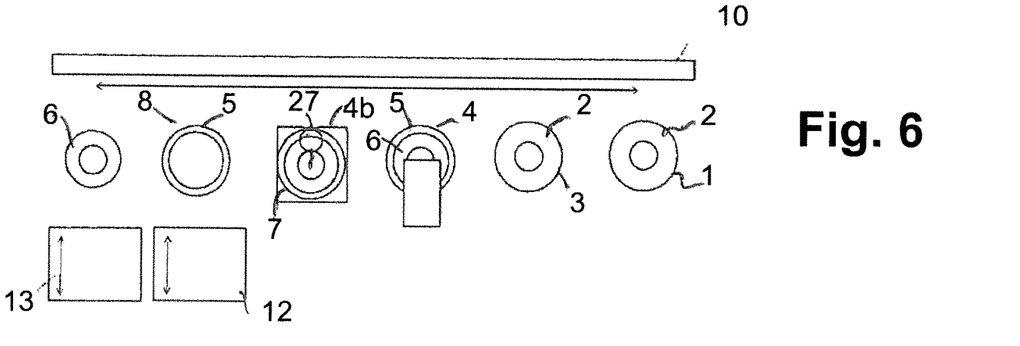
FIG. 6 shows a schematic illustration of another embodiment of an inventive notching press in the form of a linear arrangement.

The notching press according to FIG. 6 is likewise configured linearly and the individual stations are arranged adjacent to one another along the linear transport system 10. The round sheet metal blanks 2 are once again stored in the first station 1. The transport system 10 feeds the round sheet metal blanks 2 to the second station 3, in which the round sheet metal blanks 2 are aligned. Subsequently, the transport system 10 transports the aligned round sheet metal blanks 2 to the third station 4, in which the annular stator laminations 5 and the annular rotor laminations 6 are punched out of the round sheet metal blanks 2 similar to the embodiment according to FIG. 3. Subsequently, the transport system 10 feeds the punched-out laminations to the station 4b, in which these laminations 5, 6 are cleaned, as well as activated. The application of the adhesive subsequently takes place.

In the following station 8, the annular stator laminations 5 are stacked into a stator stack. For this purpose, the joining unit 12 is provided, by means of which the annular stator laminations 5 are aligned and stacked into a stator stack. The adhesive ensures that the stator laminations 5 within the stator stack are solidly connected to one another. The stator stack has the same axial height over its circumference because the stator laminations 5 were aligned before they were stacked.

The transport system 10 feeds the annular rotor laminations 6 to the station 9, in which the rotor laminations 6 are stacked into a rotor stack by means of the joining unit 13. Before the rotor laminations 6 are placed on top of one another, they are aligned in such a way that the rotor stack being produced has the same axial height over its circumference. The rotor laminations 6 lying on top of one another within the rotor stack are solidly connected to one another by means of the adhesive.

Figure 7:
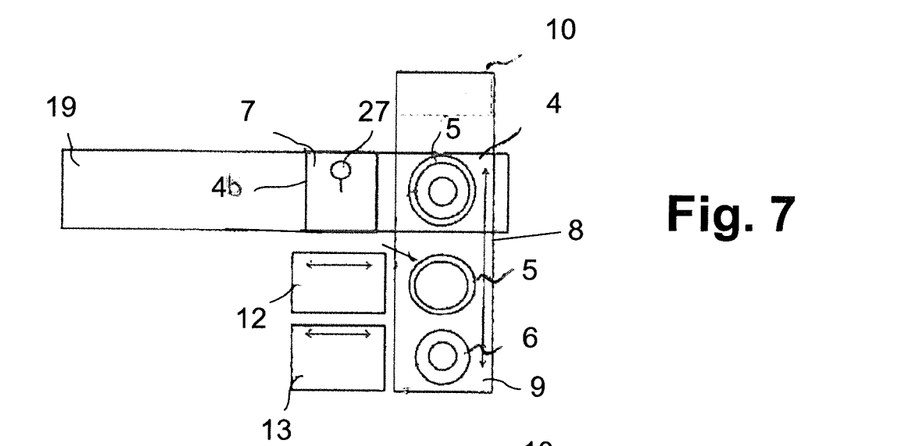
FIG. 7 shows a schematic illustration of an embodiment of an inventive high-speed blanking press in the form of a linear arrangement.

FIG. 7 shows a schematic illustration of an exemplary high-speed blanking press concept within the working area. This working area features a first station 4b, in which the electric sheet metal strip 19 is in variation 4b cleaned and activated and the adhesive is applied onto the strip 19 by means of the application device 7. In the following second station 4, the round laminations 5, 6 are punched out of the metal sheet. The punching operation is not described in greater detail in this context because this operation is well known.

In the following station 8, the annular stator laminations 5 are stacked into a stator stack. For this purpose, the joining unit 12 is provided, by means of which the annular stator laminations 5 are aligned and stacked into a stator stack. The adhesive ensures that the stator laminations 5 within the stator stack are solidly connected to one another. The stator stack has the same axial height over its circumference because the stator laminations were aligned before they were stacked.

The transport system 10 feeds the annular rotor laminations 6 to the station 9, in which the rotor laminations 6 are stacked into a rotor stack by means of the joining unit 13. Before the rotor laminations 6 are placed on top of one another, they are aligned in such a way that the rotor stack being produced has the same axial height over its circumference. The rotor laminations 6 lying on top of one another within the rotor stack are solidly connected to one another by means of the adhesive.

The transport system 10 is arranged perpendicular to the transport direction of the electric sheet metal strip 19. The stations 4, 8, 9 lie along the transport system 10.

Figure 8:
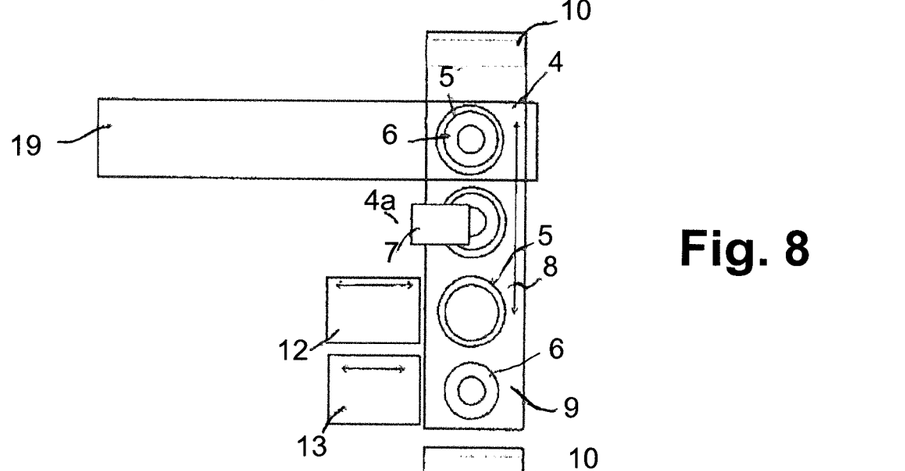
FIG. 8 shows a schematic illustration of a second embodiment of an inventive high-speed blanking press in the form of a linear arrangement.

The schematic illustration of the high-speed blanking press according to FIG. 8 likewise shows an exemplary high-speed blanking press concept within the working area. This working area features a first station 4, in which the laminations 5, 6 are punched out of the electric sheet metal strip 19. In the second station 4a, the application device 7 cleans and activates the laminations 5, 6 and applies the adhesive onto the laminations 5, 6. In the following station 8, the annular stator laminations 5 are stacked into a stator stack. For this purpose, the joining unit 12 is provided, by means of which the annular stator laminations 5 are aligned and stacked into a stator stack. The adhesive ensures that the stator laminations 5 within the stator stack are solidly connected to one another. The stator stack has the same axial height over its circumference because the stator laminations were aligned before they were stacked.

In the following station 9, the annular rotor laminations 6 are stacked into a rotor stack by means of the joining unit 13. Before the rotor laminations 6 are assembled, they are aligned such that the rotor stack being produced has the same axial height over its circumference. The rotor laminations 6 lying on top of one another are solidly connected to one another by means of the adhesive.

The stations 4, 4a, 8, 9 are arranged linearly behind one another such that the laminations 5, 6 can be fed to these stations by means of the linear transport system 10. The electric sheet metal strip 19 is supplied perpendicular to the transport direction of the transport system 10 analogous to the preceding embodiment.

Figure 9:
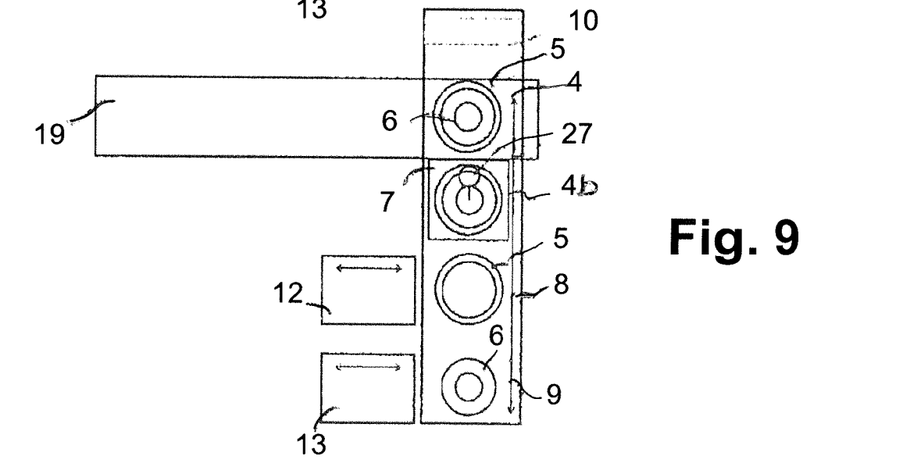
FIG. 9 shows a schematic illustration of a third embodiment of an inventive high-speed blanking press in the form of a linear arrangement.

The schematic illustration of the high-speed blanking press according to FIG. 9 likewise shows an exemplary high-speed blanking press concept within the working area. This working area features a first station 4, in which the laminations 5, 6 are punched out of the electric sheet metal strip 19. In the following station 4b, the application device 7 cleans and activates the laminations 5, 6 and applies the adhesive onto the laminations 5, 6. In the following station 8, the annular stator laminations 5 are stacked into a stator stack. For this purpose, the joining unit 12 is provided, by means of which the annular stator laminations 5 are aligned and stacked into a stator stack. The adhesive ensures that the stator laminations 5 within the stator stack are solidly connected to one another. The stator stack has the same axial height over its circumference because the stator laminations were aligned before they were stacked.

The transport system 10 feeds the annular rotor laminations 6 to the station 9, in which the rotor laminations 6 are stacked into a rotor stack by means of the joining unit 13. Before the rotor laminations 6 are placed on top of one another, they are aligned in such a way that the rotor stack being produced has the same axial height over its circumference. The rotor laminations 6 lying on top of one another within the rotor stack are solidly connected to one another by means of the adhesive.

The stations 4, 4b, 8, 9 are also arranged behind one another along the linear transport system 10 in this exemplary embodiment. The transport direction of the transport system 10 extends perpendicular to the transport direction of the electric sheet metal strip 19.

Figure 10:
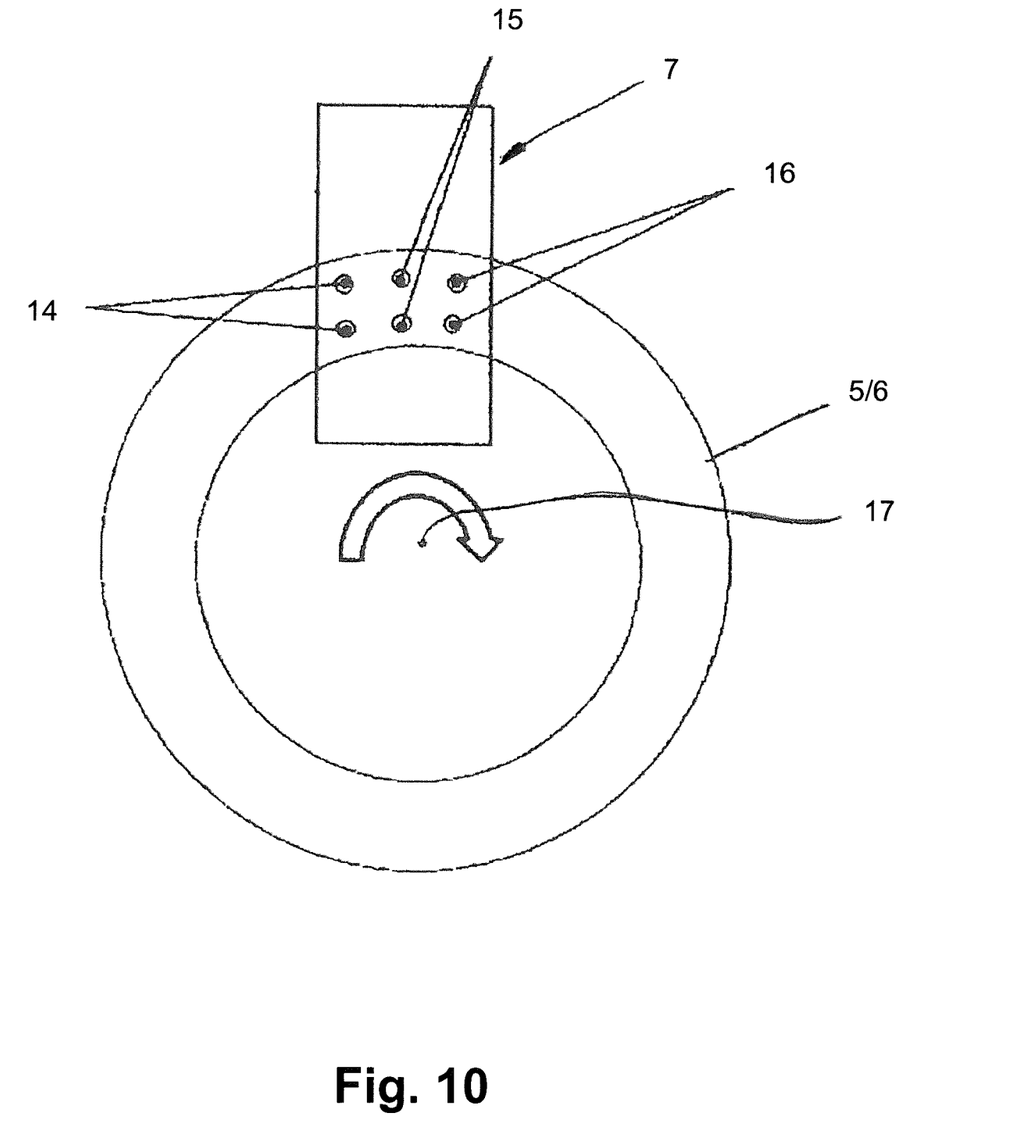
FIG. 10 shows a schematic illustration of an inventive device for applying an adhesive with cleaning and activating stations.

FIG. 10 shows an embodiment of the device 7, by means of which the adhesive can be applied onto the stator lamination 5, as well as onto the rotor lamination 6. This device 7 is used in the station 4 in the embodiments according to FIGS. 1 and 4 and in the respective stations 4a or 4b in the embodiments according to FIGS. 2, 3, 5, 6, 7, 8 and 9.

The device 7 features at least one cleaning nozzle 14, wherein said cleaning nozzle is arranged in such a way that the cleaning medium discharged therefrom impinges on the upper side of the stator lamination 5 or the rotor lamination 6. In this exemplary embodiment, two such cleaning nozzles are provided and adjacently arranged at a distance from one another.

The device 7 is furthermore provided with at least one activation nozzle 15, from which the atmospheric-pressure plasma is discharged. In the exemplary embodiment, two such activation nozzles 15 are provided and directed against the upper side of the laminations 5, 6. The two activation nozzles 15 are likewise adjacently arranged at a certain distance from one another, as well as adjacent to the cleaning nozzles 14 at a certain distance therefrom.

The device 7 is ultimately also provided with at least one application nozzle 16, by means of which the adhesive is applied onto the laminations 5, 6. In the exemplary embodiment shown, the device 7 features two such application nozzles 16 that are adjacently arranged at a distance from one another. The application nozzles 16 are also arranged at a distance from the activation nozzles 15.

The lamination 5, 6 is rotated underneath the device 7 in order to be cleaned, activated and provided with the adhesive. The lamination 5, 6 is rotated about the central axis 17 in the clockwise direction indicated with an arrow by means of a suitable rotary unit. The nozzles 14 to 16 of the device 7 are arranged in such a way that they always direct the medium toward the lamination 5, 6 while it is rotated. The device 7 and the rotary unit for the laminations 5, 6 are arranged relative to one another in such a way that the nozzles 14-16 always lie in the region of the laminations 5, 6 while the laminations 5, 6 are rotated. The nozzles 14-16 are accordingly provided on the device 7 in such a way that the medium being discharged therefrom impinges on the rotating laminations 5, 6 over their entire circumference. In the exemplary embodiment shown, the nozzles 14-16 respectively lie in a row adjacent to and on top of one another, wherein the nozzles are respectively spaced apart from one another.

The arrangement of the nozzles is realized in such a way that the cleaning medium discharged from the cleaning nozzles 14 initially cleans the upper side of the laminations 5, 6 during the rotation of these laminations 5, 6. For example, $CO_2$ snow jets may be used as cleaning medium.

After this cleaning operation, additional cleaning is carried out by means of the nozzles 15 and the cleaned surface of the laminations 5, 6 is activated such that the adhesive to be subsequently applied reliably adheres to the laminations 5, 6. For example, atmospheric-pressure plasma may be considered as cleaning and activating medium. The double cleaning operation in the described example ensures that the surface of the laminations 5, 6 is during the subsequent activation flawlessly cleaned and activated in such a way that a good adhesion of the adhesive on the laminations 5, 6 is ensured. During the rotation of the laminations 5, 6, the adhesive discharged from the nozzles 16 is therefore applied onto a cleaned and activated surface, to which the adhesive reliably adheres.

Since the laminations 5, 6 are respectively rotated underneath the device 7 or its nozzles 14 to 16, only a few nozzles suffice for providing the laminations 5, 6 with a sufficient quantity of adhesive over their entire circumference. It is easily possible to apply the adhesive over such a surface area that the adhesive surface area amounts, for example, to more than 60% of the overall surface area of the laminations 5, 6. In this way, the laminations 5, 6 within the respective stack are very solidly connected to one another by means of the adhesive. The adhesive may be applied continuously during the rotation of the laminations 5, 6 such that the entire surface of the laminations 5, 6 can be easily coated with the adhesive. Since only two nozzles 16 are required for this purpose in the exemplary embodiment, the technical effort for the planar application of the adhesive is quite low. In particular, only two valves, preferably piezo valves, are required for purposefully applying the adhesive onto the laminations 5, 6.

The adhesive does not have to be applied onto the laminations 5, 6 in a planar fashion over the entire circumference. It would by quite possible to carry out the planar application of adhesive only in individual surface area sections of the laminations 5, 6. The valves provided for applying the adhesive are actuated by a corresponding control unit in such a way that the desired application of adhesive is carried out.

The nozzles 16 may also be realized in such a way that the adhesive is not applied onto the upper side of the laminations 5, 6 in a planar fashion, but rather merely punctiform or linearly.

The mediums for cleaning and for activating the underside and the upper side of the laminations 5, 6 discharged from the nozzles 14 and 15 are advantageously applied over the entire surface area of the underside and the upper side of the laminations 5, 6 such that the entire upper side of the laminations 5, 6 is flawlessly cleaned and activated for the subsequent application of the adhesive.

Figure 16:
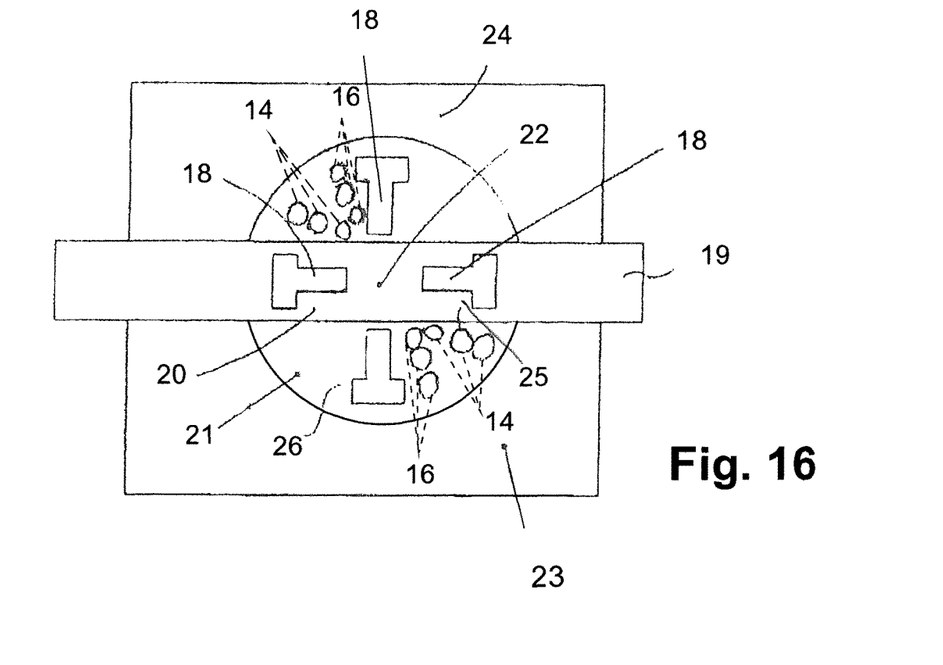

FIG. 16 shows the option of not only realizing a large-surface application of adhesive on annular laminations, but also on T-shaped lamination segments 18. These segments are conventionally punched out of a sheet metal strip 19. In the first station 20, the segment 18 is punched out of the sheet metal strip 19 and then lies in a rotatable die 21. This die is rotatable about a central axis 22 that in a top view of the sheet metal strip 19 extends centrally through the sheet metal strip 19 referred to its width. The rotatable die 21 is located in a lower tool part 23 that forms part of the blanking press.

After the punching operation, the die 21 is in the exemplary embodiment rotated by 90° in the clockwise direction such that the T-shaped segment 18 is transported into a second station 24 located in the region adjacent to the sheet metal strip 19. During the rotation from the positions 20 to 24 and/or 25 to 26, the lamination surfaces are moved past the integrated cleaning and/or activation nozzles 14, 16 and thereby cleaned and modified. They are schematically illustrated in FIG. 16. The punched-out segment 18 lying in the die 21 is therefore located outside the sheet metal strip 19. The adhesive is applied onto the segment 18 in the station 24. For this purpose, it is possible to once again use the device 7, which is not illustrated in FIG. 9 in order to provide a better overview. Since the segments have a T-shape, the corresponding nozzles are in this embodiment provided on the device in such a way that the upper side of the segments 18 can be cleaned and, if applicable, activated, as well as provided with the adhesive that may be applied in a planar, punctiform or linear fashion as explained above with reference to the exemplary embodiment according to FIG. 10.

While the adhesive is applied onto the punched-out segment 18 in the station 24, the next segment 18 is simultaneously punched out of the sheet metal strip 19 in the first station 20.

Subsequently, the die 21 is once again rotated about its axis 22 by 90° in the clockwise direction. This segment, which is provided with adhesive on its upper side, is thereby transported into a third station 25 that once again lies in the region underneath the sheet metal strip 19. The next segment 18 is punched out of the sheet metal strip 19 in this station. It is turned relative to the segment 18 punched out of the sheet metal strip 19 in the first station by 180°. However, since the die 21 is respectively rotated by 90°, the segment 18 provided with the adhesive lies in a top view of the sheet metal strip 19 congruently underneath the segment 18 punched out in the station 25. In this way, it is placed onto the segment 18 provided with the adhesive in the die 21.

The die 21 is now once again rotated by 90° in the clockwise direction such that the two segments 18, which lie on top of one another and are connected to one another by means of the adhesive, are transported into the region of the fourth station 26. In this case, the two segments 18 lying on top of one another are turned relative to the position of the segments in the opposite station 24 by 180°. In the station 26, the segments 18 are once again located in the region adjacent to the sheet metal strip 19. The adhesive is in the station 26 once again applied onto the upper segment 18 in a linear or punctiform fashion, for example, over the entire surface area of the upper segment or only sections thereof.

The segments 18 are stacked into a stack in this last station 26, Two segments, which lie on top of one another and are connected to one another by means of the adhesive, are in this case respectively placed onto the stack already produced in the station 26 in the above-described fashion. In this way, a segment stack or stack of laminations, in which the segments 18 are solidly connected to one another by means of the adhesive, is produced in the station 26.

In the system according to FIG. 16, the described operations take place simultaneously in all four stations. In the two stations 24, 26 that lie on opposite sides of the sheet metal strip 19, the devices discharging the adhesive respectively lie above the segments 18. This results in a very compact design of the system in comparison with conventional systems, in which the adhesive application unit is located in the region of front of the respective tool.

Figure 17:
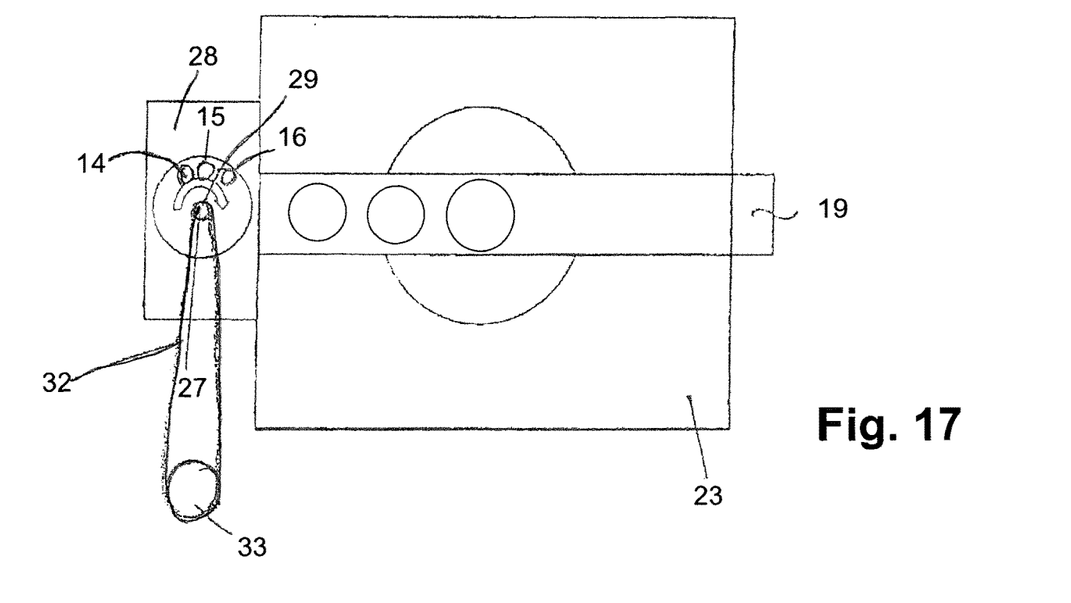

FIG. 17 shows the option of applying the adhesive onto the annular laminations 5, 6 in the tool by means of a rotating element 27 within an application device 28. This application device 28 is located adjacent to the lower tool part 23. The laminations are conventionally punched out of the sheet metal strip 19. In order to apply the adhesive onto the electric sheet metal strip, as well as to ensure the prior cleaning and activation, the rotating element 27 applies the adhesive onto the electric sheet metal strip located thereunder. During this operation, the element 27 rotates about the rotational axis 29 that in a top view of the sheet metal strip 19 perpendicularly extends through the center of the sheet metal strip referred to its width. The annular laminations 5, 6 are conventionally punched out of the sheet metal strip 19 and stacked. Similar to the preceding description of the device according to FIG. 10, the application device 28 features at least an application nozzle 16, from which the adhesive is discharged during the rotation of the element 27. The nozzle 16 is actuated by the control unit in such a way that the adhesive is applied onto the upper side of the annular lamination over its entire surface area or only sections thereof in a linear, punctiform or similar fashion, in contrast to the device according to FIG. 10, the element 27 of the device 28 is driven in a revolving or rotating fashion while the annular laminations 5, 6 remain stationary. The movable part 27 is preferably driven by a controlled motor 33 via a V-belt 32.

The different applications of adhesive are explained below with reference to FIGS. 11 to 12.

Figure 11:
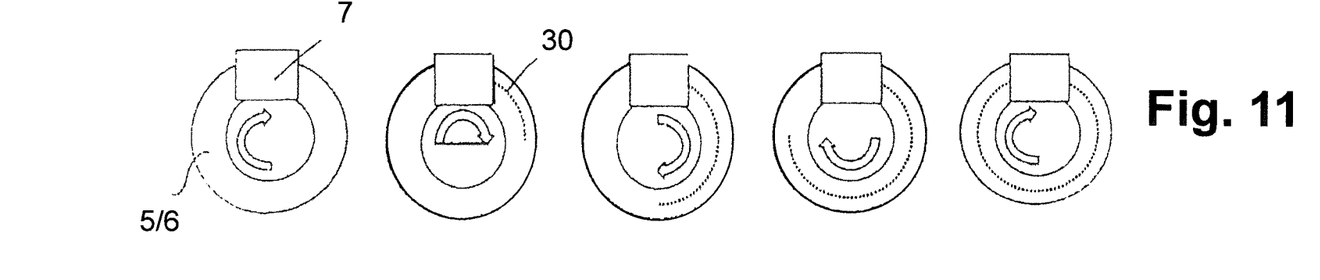
FIG. 11 shows the application of the adhesive with rotating lamination.

In the embodiment according to FIG. 11, the annular laminations 5, 6 rotate underneath the device 7 as explained above with reference to FIG. 10. The application of adhesive is symbolized with a dotted line 30. The dotted line 30 should not be interpreted as a linear application of adhesive, but rather is intended to elucidate that the adhesive is applied due to a 360° rotation of the lamination 5, 6. This application of adhesive may be carried out over the entire surface area or only sections thereof in a linear, punctiform or similar fashion. In this context, the different techniques for applying the adhesive onto the upper side of the laminations 5, 6 may also be used in combination. For example, it would be conceivable to partially apply the adhesive in sections along the circumference of the lamination 5, 6 and to connect these sections with a linearly applied adhesive. In this way, the application of the adhesive can be very easily adapted to the respective requirements. FIG. 12 shows the option of moving the device 7 along the circumference of the lamination 5, 6 rather than moving the annular lamination 5, 6 itself. In this case, the adhesive is applied over the circumference of the respective lamination 5, 6 as indicated with the dotted line 30. As already mentioned with reference to FIG. 11, the dotted line 30 does not mean that the adhesive is applied linearly. Depending on the respective circumstances, the adhesive is applied onto the upper side of the annular laminations 5, 6 over the entire surface area or only sections thereof in a linear or punctiform fashion or even with a combination of the different application techniques.

Figure 13:
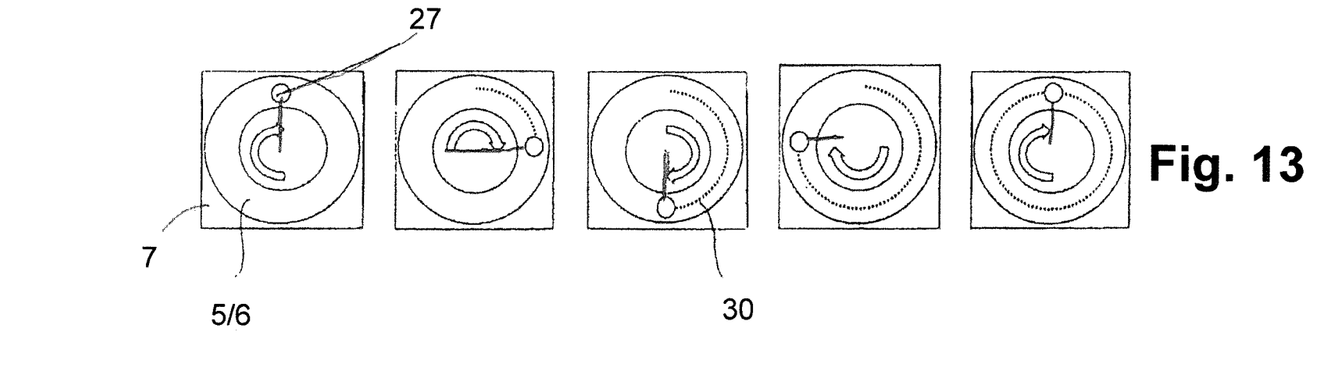
FIG. 13 shows the application of the adhesive by means of a device with a rotary unit.

FIG. 13 ultimately shows the sequence of the application of the adhesive when the application device 28 according to FIGS. 3, 6, 7 and 9 is used. In this case, the annular lamination 5, 6, as well as the electric sheet metal strip 19, preferably stands still while the rotating element 27 carries out a rotation by up to 360°. During this operation, the adhesive is applied over the circumference of the annular lamination 5, 6. The application of the adhesive is once again symbolized with a dotted line 30. The application of the adhesive may take place over the entire surface area or only sections thereof in a linear or punctiform fashion or even with a combination of these different application techniques. As explained above with reference to the example according to FIG. 10, the rotating element 27 may feature the nozzles 14-16 for cleaning and, if applicable, activating the annular laminations 5, 6 and for applying the adhesive. The nozzles are controlled by valves, wherein the valves are connected to the control unit, by means of which the valves can be actuated in the desired fashion.

It would also be possible to respectively provide only one nozzle 14, 15, 16 depending on the radial width of the annular laminations 5, 6. It would likewise be possible to use more than two cleaning nozzles 14, activation nozzles 15 and application nozzles 16. It would even be conceivable to provide the different nozzles 14, 15, 16 in different quantities. The respective nozzles 14 to 16 are actuated independently of one another by the control unit. If two or even more nozzles of each type are provided, it is also advantageous that the control unit actuates nozzles of the same type independently of one another. In this way, sections of the upper side of the annular laminations 5, 6 can be purposefully cleaned and/or activated and/or provided with the adhesive.

In the different exemplary embodiments, the respective stack of laminations is assembled in the die 21. This die conventionally features a brake that exerts a braking force upon the stack. This braking force is so high that a secure bond with the respective laminations 5, 6, 18 is ensured when the respectively last lamination 5, 6 or the last segment 18 is pressed onto the already produced part of the stack. For this purpose, the laminations 5, 6, 18 are pressed onto the already stacked laminations by a plunger. The brake may be formed by subrings, the inside diameter of which is slightly smaller than the outside diameter of the punched-out laminations 5, 6. When bundling the T-shaped segments 18, the receptacle space for these segments is realized in such a way that its outside dimensions are also slightly smaller than the outside dimensions of the T-shaped segments 18 and the respective segment stack being produced is thereby likewise decelerated.

Once the desired stack height is reached, the supply of adhesive is interrupted, i.e. the valve of the respective application nozzles 16 is closed, such that no adhesive is applied onto the respective annular lamination 5, 6 or the segment 18. These laminations 5, 6, 18 therefore do not adhere to the preceding or, depending on the design of the system, to the following lamination. The desired stack height is defined in this way.

With respect to the annular laminations 5, 6, an alignment of the annular laminations 5, 6 takes place in the station 8 (FIGS. 1 to 4), as well as in the station 9 in the embodiment according to FIG. 3. During this operation, the annular laminations 5, 6 are rotated about their longitudinal axis in such a way that the stack being produced in the die has a constant height over its circumference. In order to carry out this alignment, the die with the brake is rotated about its longitudinal axis, for example, by means of a belt-pulley drive such that the stack located in the die is rotated by the corresponding angle. The rotation takes place before the next annular lamination 5, 6 is pressed onto the partial stack in the brake in the die. Since the connection between the laminations 5, 6 lying on top of one another is produced by means of the adhesive only, the angle of rotation of the die can be optimally adapted to the respective stack of laminations to be produced. In this context, any angle of rotation is possible because the way, in which the laminations fit together, is not subject to any physical restrictions.

In the embodiment according to FIG. 16, the thickness of the respective partial stack or the complete stack of segments 18 can be measured in the stations 24, 26 located to both sides of the sheet metal strip 19. This makes it possible to determine the stack height very precisely because the height of the respective partial stack being produced can be directly measured in these stations. In conventional methods, the stack height is determined indirectly based on the strip thickness or the number of segments contained in the partial stack, i.e. by means of an inaccurate stack height measurement, whereas the respective stack height is measured directly (immediately) in the embodiment according to FIG. 16. This results in a very accurate determination of the stack height.

Since the adhesive surface area on the upper side of the laminations 5, 6, 18 is significantly larger than half the upper surface area of these laminations, the laminations 5, 6 lying on top of one another within the stack are flawlessly and solidly connected to one another. In this way, these stacks of laminations can also be used in high-speed motors and generators.

In the described and illustrated exemplary embodiments, the stator laminations 5 and the rotor laminations 6 consist of a one-piece ring. However, it is also possible to assemble the annular stator laminations and rotor laminations 6 of individual segments. In this case, the segments are individually punched out and stacked into stacks that are then in turn respectively assembled into an annular stator stack or rotor stack.

Figure 12:
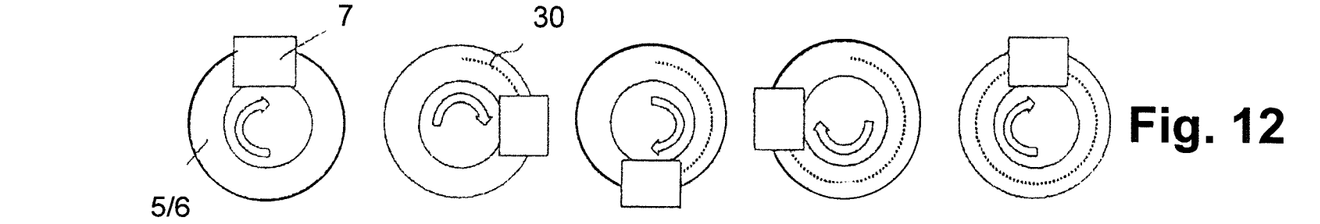
FIG. 12 shows the application of the adhesive by means of a rotating device.

In the exemplary embodiments according to FIGS. 1 to 5, the adhesive is applied as long as the annular laminations 5, 6 or the device 7 rotate about the common axis of rotation as illustrated in an exemplary fashion in FIGS. 11 to 13.

The discharge of the adhesive can be realized with any valve system that makes it possible to apply the adhesive onto the laminations 5, 6, 18. It is advantageous to use a valve system that is based on piezoelectric technology. Piezo valves make it possible to ensure a precise application of the adhesive.

The adhesive can be applied onto the upper side of the respective lamination 5, 6, 18 in a contactless fashion, as well as with contacting methods.

In the preferred embodiment, the different nozzles 14 to 16 are provided on a common device 7 (FIG. 10). This results in a particularly simple and compact design of this device 7. It is furthermore possible, for example, to provide the application nozzles 16 on a separate device that is arranged on the system spatially separate of the nozzles 14 and 15. In this case, it is reliably prevented that the cleaning medium and/or the activation medium interferes with the application of the adhesive. It would be possible, for example, to arrange such a separate device, which only features the at least one application nozzle 16, at an angle of 90° or 180° relative to the device, which only features the nozzles 14, 15. The annular laminations 5, 6 are then rotated in such a way that the desired application of adhesive is carried out as intended over the circumference of the laminations 5, 6.

Figure 14:
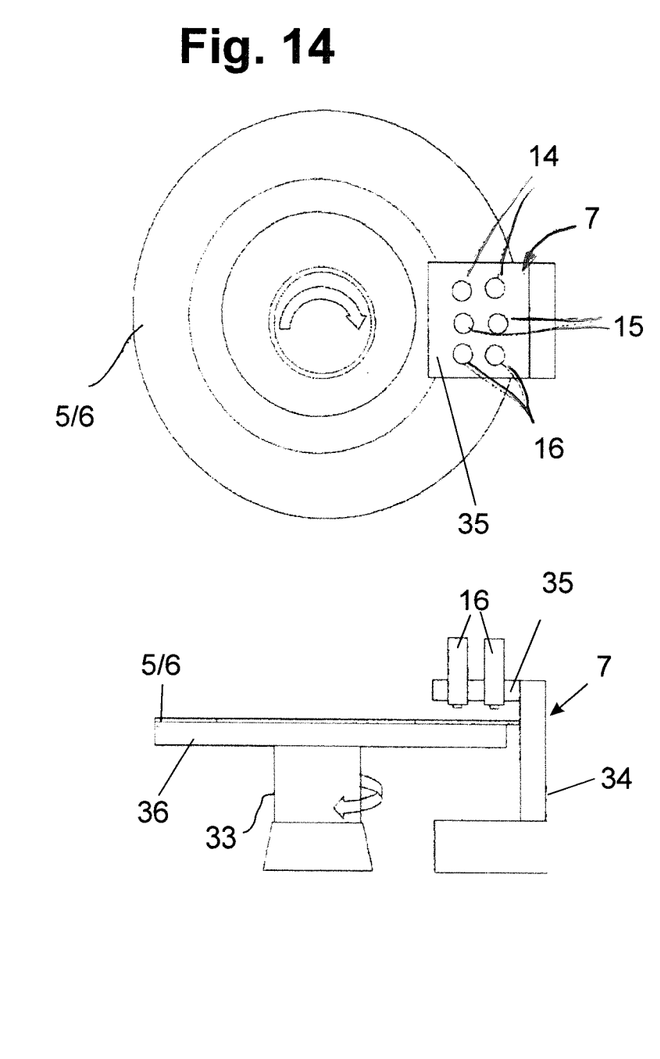
FIG. 14 shows schematic top and side views of an embodiment of an inventive unit for applying adhesive onto a rotating lamination.

FIG. 14 shows an example of such a separate device 7. It features the cleaning nozzles 14, the activation nozzles 15 and the application nozzles 16 that are respectively provided in pairs. The design of this device 7 corresponds to the design explained above with reference to the example according to FIG. 10. The pairs of nozzles are respectively arranged in rows adjacent to and behind one another. The device 7 features a frame 34 with a transversely protruding arm 35, on which the nozzles 14 to 16 are arranged.

The nozzles 14 to 16 point downward in the direction of the laminations 5, 6 that can be rotated about a vertical axis by means of the drive unit 33. The laminations 5, 6 lie on a rotary table 36 that is rotatively driven about its axis by means of the drive unit 33. The nozzles 14 to 16 are arranged in such a way that the adhesive can be applied over the circumference of the laminations 5, 6 during the rotation thereof.

In addition, it is advantageously possible to optionally adjust the distance between the nozzles 14 to 16 and the laminations 5, 6. This can be realized, for example, by adjusting the nozzles 14 to 16 relative to the arm 35 or by adjusting the arm 35 with the nozzles 14 to 16.

Figure 15:
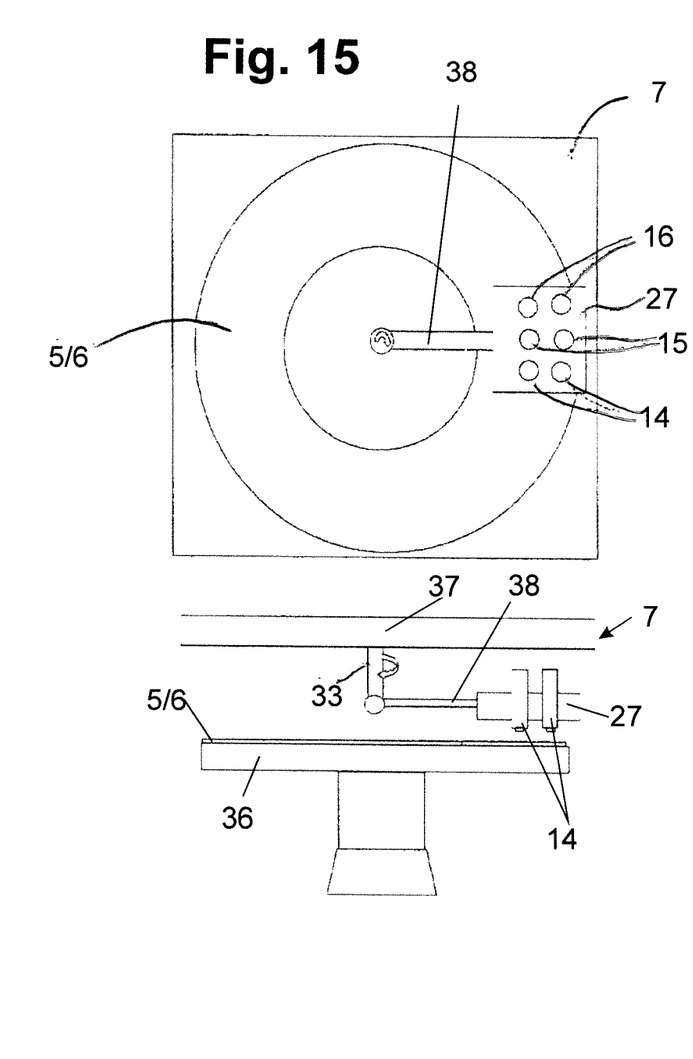
FIG. 15 shows schematic top and side views of an embodiment of an inventive unit for applying adhesive by means of a device with a rotary unit, and FIGS. 16 and 17 respectively show a schematic illustration of another embodiment of an inventive unit for applying adhesive.

FIG. 15 schematically shows an exemplary embodiment, in which the device 7 is rotated about a vertical axis rather than the annular laminations 5, 6. The device 7 features a carrier 37 that is located a certain distance above the rotary table 36 and from which the drive unit 33 centrally protrudes in the direction of the rotary table 36. The drive unit 33 carries an arm 38 that radially protrudes from the drive unit 33 and carries the rotating element 27 on its free end. The nozzles 14-16 are provided on the rotating element. The drive unit 33 moves the element 27 in a revolving fashion such that the annular laminations 5, 6 lying on the rotary table 36 can be cleaned, activated and provided with adhesive in the described fashion. In this embodiment, it is also advantageous if the distance between the nozzles 14 to 16 and the laminations 5, 6 can be adjusted, namely either by adjusting the nozzles or the element 27.

What is claimed is:

1. A system for carrying out a method for producing stacks of laminations, in which at least one adhesive is applied onto annular laminations with at least one application device and laminations are stacked into a stack of laminations, the method comprising: rotating each of the laminations (5, 6) about its axis (17) in an application area of the application device and/or moving the application device about the axis (17) of the lamination (5, 6) in order to apply the adhesive; wherein the system comprises:
at least one punching tool configured to punch the laminations out of a sheet metal material;
a station (4a, 8, 9) comprising the application device comprising at least one application nozzle (16) configured to apply the at least one adhesive onto the laminations (5, 6), wherein the application device further comprises at least one cleaning nozzle (14) arranged upstream of the at least one application nozzle (16) and configured to clean the laminations (5, 6);
wherein the station is arranged downstream of the punching tool (4).

2. The system according to claim 1, further comprising a rotary unit (33, 36) configured to rotate the laminations (5, 6) by one 360° rotation about the axis (17) of the laminations (5, 6) while applying the at least one adhesive onto the laminations (5, 6).

3. The system according to claim 1, further comprising a rotary unit configured to rotate the application device, wherein the application device has a rotational axis coinciding with the axis (17) of the laminations (5, 6) and wherein the application device comprises a first end disposed at the rotational axis and a second end radially displaced away from the rotational axis, wherein the second end of the application device is configured to rotate by one 360° rotation about the rotational axis while applying the at least one adhesive onto the laminations (5, 6).

4. A system for carrying out a method for producing stacks of laminations, in which at least one adhesive is applied onto annular laminations with at least one application device and laminations are stacked into a stack of laminations, the method comprising: rotating each of the laminations (5, 6) about its axis (17) in an application area of the application device and/or moving the application device about the axis (17) of the lamination (5, 6) in order to apply the adhesive; wherein the system comprises:
at least one punching tool configured to punch the laminations out of a sheet metal material;
a station (4a, 8, 9) comprising at least one activation nozzle (15) configured to activate and clean a surface of the laminations (5, 6);
the station (4a, 8, 9) further comprising the application device configured to apply the at least one adhesive onto the laminations (5, 6) downstream of the at least one activation nozzle (15);
wherein the station (4a, 8, 9) is arranged downstream of the punching tool (4).

5. The system according to claim 4, further comprising a rotary unit (33, 36) configured to rotate the laminations (5, 6) by one 360° rotation about the axis (17) of the laminations (5, 6) while applying the at least one adhesive onto the laminations (5, 6).

6. The system according to claim 4, further comprising a rotary unit configured to rotate the application device, wherein the application device has a rotational axis coinciding with the axis (17) of the laminations (5, 6) and wherein the application device is configured to rotate by one 360° rotation about the rotational axis while applying the at least one adhesive onto the laminations (5, 6).

7. The system according to claim 4, wherein the application device comprises at least one application nozzle (16) configured to apply the at least one adhesive onto the laminations (5, 6), wherein the application device further comprises the at least one activation nozzle (15) configured to activate and clean the surface of the laminations (5, 6).

8. A system for carrying out a method for producing stacks of laminations, in which at least one adhesive is applied onto annular laminations with at least one application device and laminations are stacked into a stack of laminations, the method comprising: rotating each of the laminations (5, 6) about its axis (17) in an application area of the application device and/or moving the application device about the axis (17) of the lamination (5, 6) in order to apply the adhesive; wherein the system comprises:

at least one punching tool configured to punch the laminations out of a sheet metal material;

a station (4a, 8, 9) comprising the application device comprising at least one application nozzle (16) configured to apply the at least one adhesive onto the laminations (5, 6), wherein the application device further comprises at least one cleaning nozzle (14) configured to clean the laminations (5, 6) and at least one activation nozzle (15) configured to activate and clean a surface of the laminations (5, 6), wherein the at least one application nozzle (16) is arranged downstream of the at least one activation nozzle (15);

wherein the station (4a, 8, 9) is arranged downstream of the punching tool (4).

9. The system according to claim 8, further comprising a rotary unit (33, 36) configured to rotate the laminations (5, 6) by one 360° rotation about the axis (17) of the laminations (5, 6) while applying the at least one adhesive onto the laminations (5, 6).

10. The system according to claim 8, further comprising a rotary unit configured to rotate the application device, wherein the application device has a rotational axis coinciding with the axis (17) of the laminations (5, 6) and wherein the application device is configured to rotate by one 360° rotation about the rotational axis while applying the at least one adhesive onto the laminations (5, 6).

* * * * *